(12) United States Patent
Docter et al.

(10) Patent No.: US 9,199,158 B2
(45) Date of Patent: Dec. 1, 2015

(54) SKATEBOARD / LONGBOARD TRUCK WITH IMPROVED MECHANICAL ADVANTAGE

(71) Applicant: Dashboards Skimboards Company, LLC, Fife, WA (US)

(72) Inventors: Lloyd W. Docter, Tacoma, WA (US); Timothy R. Mackey, Tacoma, WA (US)

(73) Assignee: DASHBOARDS SKIMBOARDS COMPANY, LLC, Fife, WA (US)

( * ) Notice: Subject to any disclaimer, the term of this patent is extended or adjusted under 35 U.S.C. 154(b) by 0 days.

(21) Appl. No.: 14/537,876

(22) Filed: Nov. 10, 2014

(65) Prior Publication Data

US 2015/0130154 A1 May 14, 2015

Related U.S. Application Data

(60) Provisional application No. 61/903,790, filed on Nov. 13, 2013.

(51) Int. Cl.
*A63C 17/01* (2006.01)
*A63C 17/00* (2006.01)
*B62M 1/00* (2010.01)

(52) U.S. Cl.
CPC .......... *A63C 17/0093* (2013.01); *A63C 17/0046* (2013.01); *A63C 17/01* (2013.01); *A63C 17/015* (2013.01); *A63C 2203/42* (2013.01); *B62M 1/00* (2013.01)

(58) Field of Classification Search
None
See application file for complete search history.

(56) References Cited

U.S. PATENT DOCUMENTS

| | | | | |
|---|---|---|---|---|
| 4,089,536 | A | | 5/1978 | Larrucea |
| 4,109,925 | A | | 8/1978 | Williams et al. |
| 4,152,001 | A | * | 5/1979 | Christianson ............... 280/11.28 |
| 4,155,565 | A | * | 5/1979 | de Caussin et al. ....... 280/87.042 |
| 4,176,850 | A | * | 12/1979 | Johnson .................... 280/87.042 |
| 4,184,693 | A | * | 1/1980 | Whitmarsh ................ 280/11.28 |
| 4,898,398 | A | | 2/1990 | Cassel |
| 5,263,725 | A | * | 11/1993 | Gesmer et al. ............. 280/11.28 |
| 5,868,408 | A | | 2/1999 | Miller |
| 6,315,312 | B1 | | 11/2001 | Reyes et al. |
| 6,318,739 | B1 | * | 11/2001 | Fehn, Jr. .................... 280/11.28 |
| 6,367,819 | B1 | * | 4/2002 | Andersen et al. .......... 280/11.28 |
| 6,474,666 | B1 | * | 11/2002 | Andersen et al. ........ 280/87.041 |
| 6,511,083 | B1 | | 1/2003 | Tsai |
| 6,523,837 | B2 | * | 2/2003 | Kirkland .................... 280/11.28 |
| 6,527,284 | B2 | | 3/2003 | Bert |
| 6,536,788 | B1 | * | 3/2003 | Kuncz et al. ............. 280/87.041 |
| 6,547,262 | B1 | * | 4/2003 | Yamada et al. ............. 280/11.28 |
| 6,793,224 | B2 | * | 9/2004 | Stratton ................... 280/87.042 |
| 6,913,272 | B2 | * | 7/2005 | Chang ....................... 280/87.042 |
| 6,932,262 | B2 | * | 8/2005 | Kurita et al. .................... 228/1.1 |
| 6,932,362 | B1 | | 8/2005 | Barrett |
| 6,979,007 | B1 | * | 12/2005 | Hosoda .................... 280/87.042 |
| 7,007,977 | B1 | * | 3/2006 | Gallagher ....................... 280/809 |
| 7,044,485 | B2 | * | 5/2006 | Kent et al. ................ 280/87.042 |
| 7,070,193 | B2 | * | 7/2006 | Yamaguchi .............. 280/87.042 |
| 7,093,842 | B2 | * | 8/2006 | Chmelar .................. 280/87.042 |
| 7,104,558 | B1 | * | 9/2006 | Saldana ................... 280/87.042 |
| 7,121,566 | B2 | * | 10/2006 | McClain .................. 280/87.042 |

(Continued)

*Primary Examiner* — S. Joseph Morano
*Assistant Examiner* — Hilary L Johns
(74) *Attorney, Agent, or Firm* — Eric W. Cernyar

(57) ABSTRACT

A skateboard or longboard truck comprises a hanger and a baseplate assembly. A redesigned hanger, a large ball pivot, a load-redirecting pivot cup, a tapered kingpin and other improvements give the hanger a high kingpin ratio and a high angle of mechanical advantage, thereby improving the performance and turning characteristics of the truck.

8 Claims, 16 Drawing Sheets

(56) References Cited

U.S. PATENT DOCUMENTS

| | | | |
|---|---|---|---|
| 7,150,460 B2 * | 12/2006 | Williams | 280/87.042 |
| 7,192,030 B1 * | 3/2007 | Murphy | 273/317 |
| 7,232,139 B2 * | 6/2007 | Cole | 280/87.042 |
| 7,243,925 B2 * | 7/2007 | Lukoszek | 280/11.28 |
| 7,287,762 B2 | 10/2007 | Stratton | |
| 7,364,174 B2 | 4/2008 | Morris | |
| 8,152,176 B2 | 4/2012 | Wilson et al. | |
| 8,292,311 B2 | 10/2012 | De Las Casas | |
| 8,371,594 B2 | 2/2013 | Palmer et al. | |
| 8,783,699 B2 | 7/2014 | Gesmer | |
| 2010/0140885 A1 * | 6/2010 | Corrente | 280/11.27 |
| 2015/0130155 A1 | 5/2015 | Docter et al. | |
| 2015/0130156 A1 | 5/2015 | Docter et al. | |

\* cited by examiner

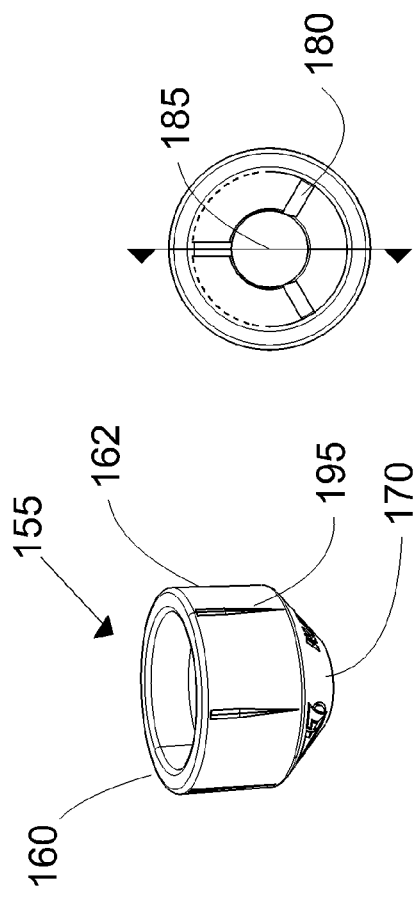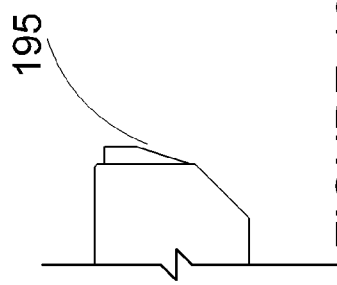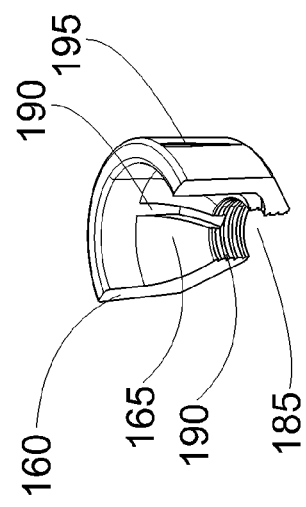

SKATEBOARD / LONGBOARD TRUCK WITH IMPROVED MECHANICAL ADVANTAGE

RELATED APPLICATIONS

This application claims the benefit of our U.S. Provisional Application No. 61/903,790, filed Nov. 13, 2013, and entitled "Skateboard/Longboard Truck With Active Massive Ball Pivot Mechanism," which is herein incorporated by reference.

FIELD OF THE INVENTION

The field of the invention is skateboards and longboards, and more particularly, trucks for skateboards and longboards.

BACKGROUND

Traditional skateboard truck assemblies accomplish the action of turning when the rider shifts his weight on the skateboard deck from neutral to either side of the skateboard's longitudinal axis.

Consistent with FIG. 1 a complete skateboard assembly consists of two skateboard trucks with four attached wheels that are attached to a skateboard deck. Each skateboard truck comprises a baseplate assembly, which is attached to the deck, and a hanger assembly on which the wheels are hung.

As a rider leans the skateboard deck from side to side, the axle integral to the skateboard truck hanger assembly is forced to stay parallel to the ground as long as the weight of the rider forces the wheels to remain in contact with ground. Rotation of the skateboard deck around an axis parallel to the longitudinal centerline of the skateboard deck causes the skateboard truck hanger assemblies to rotate—while staying parallel to the ground—about other axes, resulting in a turning action transmitted through the skateboard truck assemblies.

Furthermore, when the deck of a typical skateboard is rotated, it causes the hanger assembly to rotate about an axis between the center of the extreme end of the pivot and a point in the center of the hanger aperture coincident with the longitudinal centerline of the kingpin. This causes fore and aft movement of the hanger and the wheels attached to it relative to the neutral position of the trucks when the deck is evenly weighted and parallel to the ground. As the rider angles the deck, the wheels proximate to the weighted side that is angled toward the ground move toward the middle of the skateboard deck, and the wheels on the opposite side from the weighted edge of the deck move away from the middle of the skateboard deck toward the ends of the skateboard deck. The result is that the trucks allow the rider to turn the skateboard by converting the force created by the leaning of the skateboard deck into a controlled turning action. The turning action is accomplished by the fore and aft movement of the wheels attached to the skateboard trucks as they rotate on the kingpin which is oriented at an angle less than 90 degrees to the ground plane (FIG. 8).

SUMMARY

A skateboard or longboard truck is provided that comprises a hanger and a baseplate assembly. The hanger includes a structural axle-bearing member and a pivot extending out perpendicularly from the structural member, a bushing seat and kingpin aperture located between the structural member and the pivot. The hanger is oriented along a lateral axis and configured to support two wheels. The baseplate assembly has a base that mounts underneath a skateboard or longboard deck. The baseplate assembly also has a mounting flange configured to receive a kingpin to secure the hanger assembly to the baseplate assembly.

In one aspect of the invention, the hanger is configured with an angle of mechanical advantage of at least twenty degrees, wherein the angle is defined by two lines: the first line runs between a center of the kingpin aperture coincident with a longitudinal center of the kingpin and the pivot's center of rotation, and a second line runs between an outermost contact point of the ball pivot with the pivot cup and an opposing outermost bearing surface of the bushing seat.

In another aspect of the invention, a kingpin ratio, defined by a distance between a lateral axle centerline perpendicular to the kingpin and a kingpin longitudinal centerline, divided by a distance between a pivot center and the kingpin longitudinal center line, expressed as a percentage, is more than fifty-two percent.

BRIEF DESCRIPTION OF THE DRAWINGS

The benefits, features, and advantages of the present invention will become better understood with regard to the following description, and accompanying drawings where:

FIG. 9 is a perspective view of the pivot cup of FIG. 3,

FIG. 10 is top view of the pivot cup of FIG. 3, illustration the airgap.

FIG. 11 is a perspective cut-away view of the pivot cup of FIGS. 3 and 10, illustrating the threaded airgap and cleaning grooves FIG. 12 is a side view of the pivot cup of FIGS. 3, 10, and 11, showing the tolerance fin.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 8:
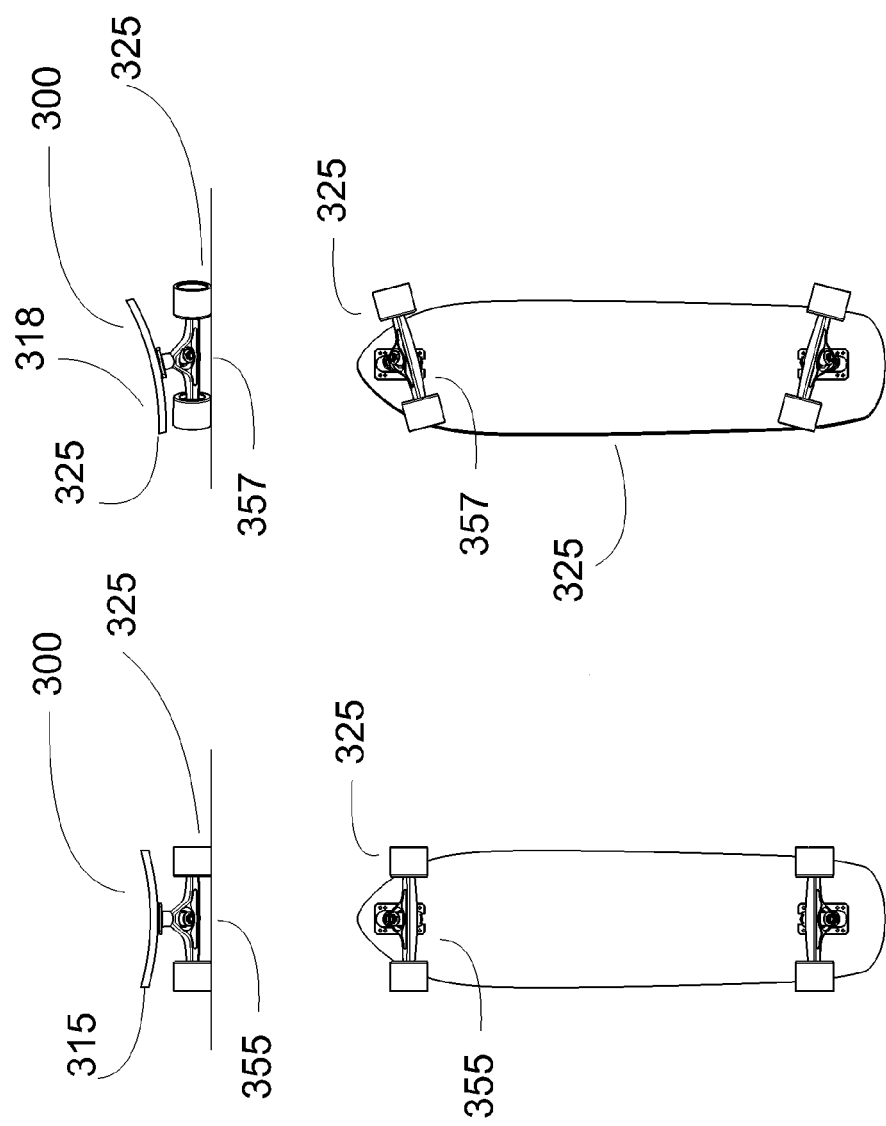
FIG. 8 is a bottom view of the skateboard assembly of FIG. 1, illustrating the relation between deck angle and truck turning angle.

The invention relates to a mechanism known in general terms as a skateboard truck. A skateboard truck connects wheels to a skateboard or longboard deck allowing articulation of the wheels attached to the skateboard truck by application of the rider's weight to one side of the deck (FIG. 8). Application of weight to the edge of the skateboard deck allows the skateboard to be turned as the articulation of the deck converts deck angle changes into fore and aft movement of wheels attached to the skateboard truck. The invention improves on prior art in multiple ways, including an improved functional geometry, improved structural design, improved constructability, improved maintainability, and improved durability resulting in smoother and more responsive or immediate turning performance.

Figure 1:
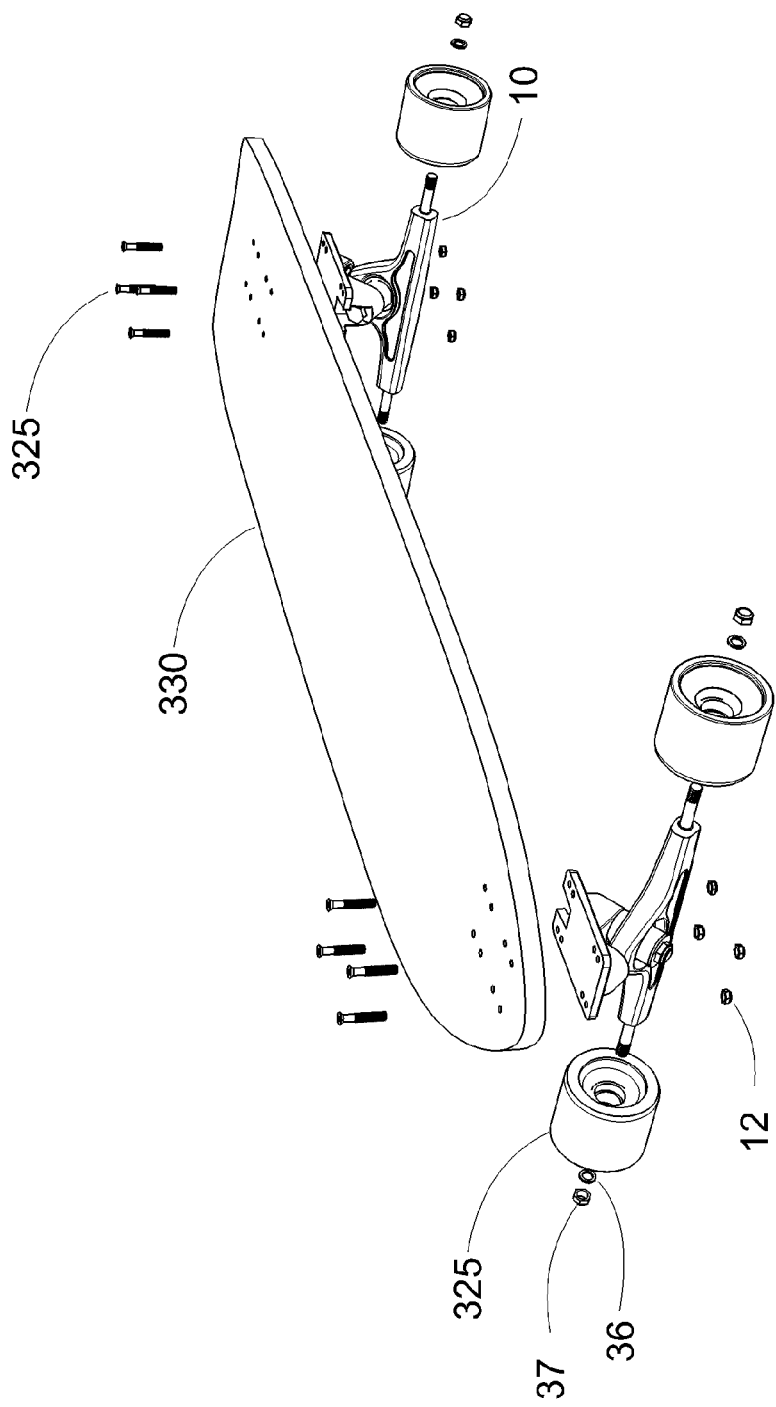
FIG. 1 is a perspective view of a complete skateboard or longboard assembly
Figure 2:
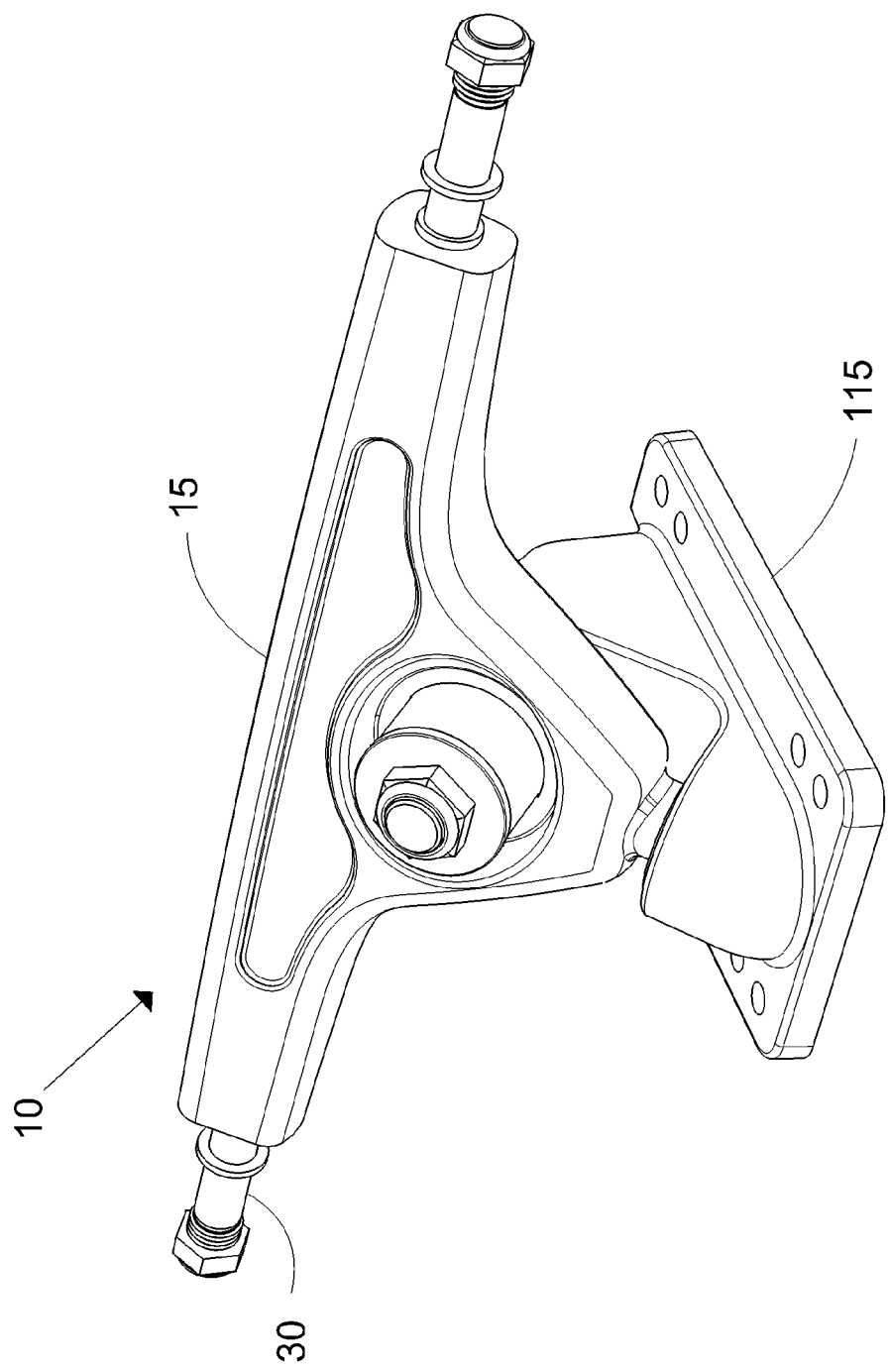
FIG. 2 is a perspective view of one embodiment of a skateboard or longboard truck according to the present invention.

The skateboard truck is comprised of two major assemblies, the ball pivot hanger assembly and the baseplate assembly. The assemblies are mechanically joined together and retained by a kingpin washer, elastomeric bushings, and kingpin nut (FIG. 1).

Figure 3:
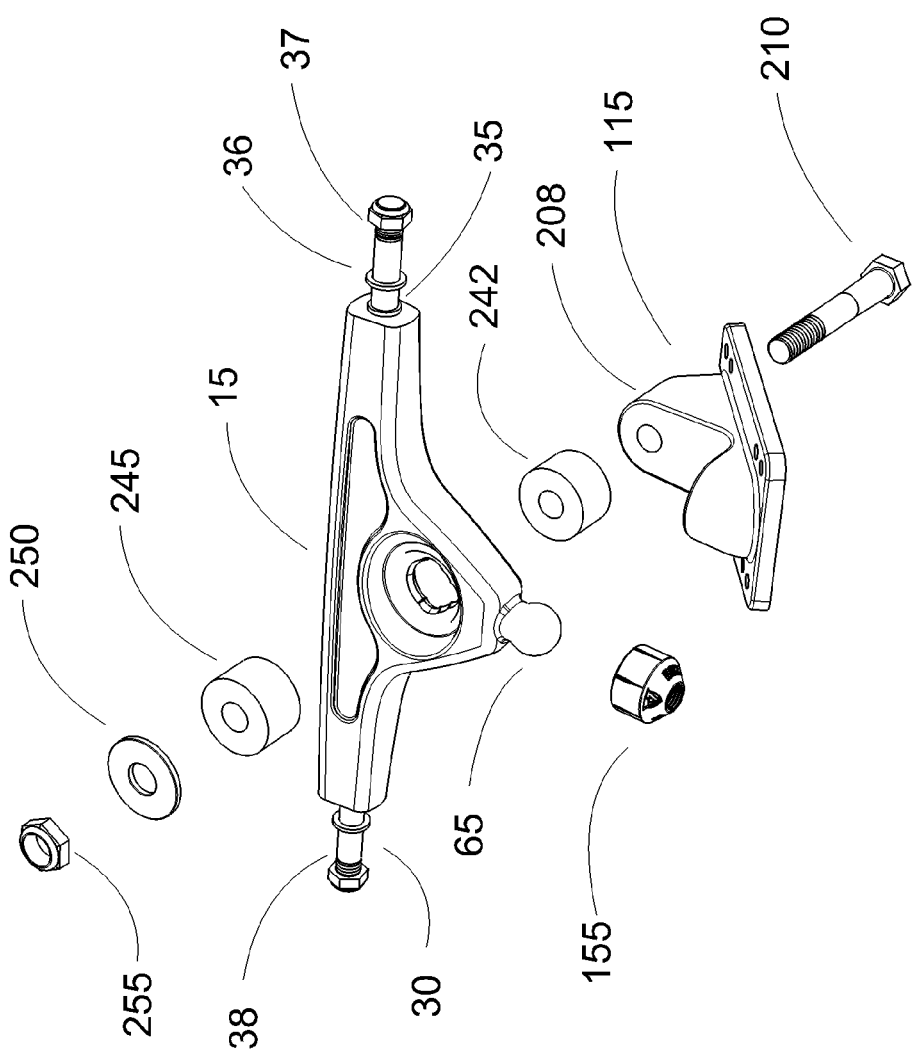
FIG. 3 is an exploded perspective view of one embodiment of a skateboard or longboard truck according to the present invention.
Figure 15A:
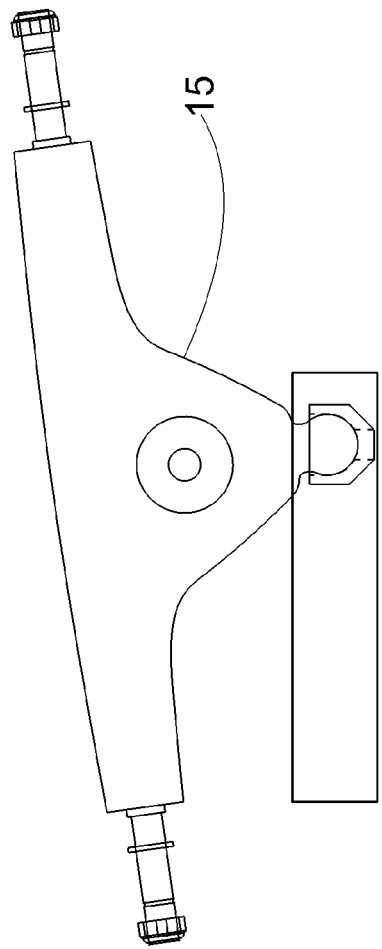
FIG. 15A is a view of the hanger assembly of FIG. 3 while articulated, as it would characteristically be if the skateboard or longboard deck were bearing a statically unbalanced load.
Figure 15B:
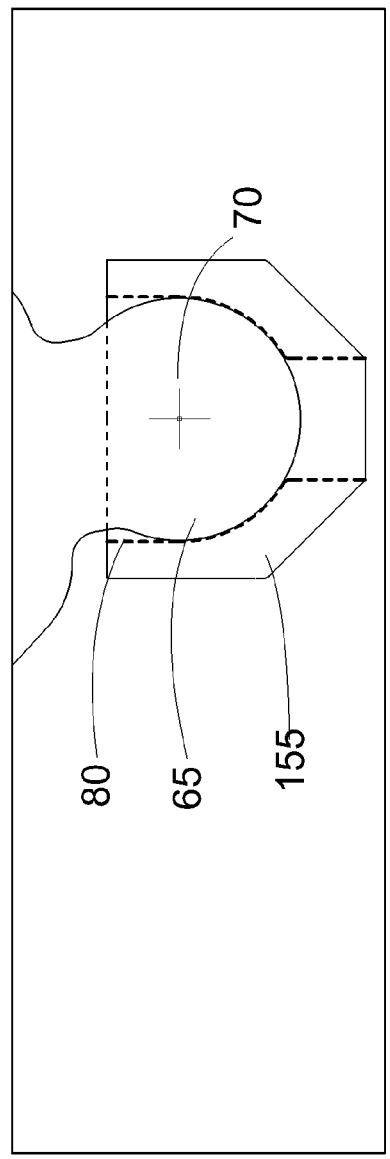
FIG. 15B is a detail view of the ball pivot and pivot cup of FIG. 16A, showing the non-interference zone of the ball pivot and pivot cup.

The hanger assembly is comprised of the hanger body, axle, axle washers and axle nuts. The body of the hanger incorporates a structural member oriented along a lateral axis perpendicular to and distal from the ball pivot. An axle made of a dissimilar material passes through the beam section of the body parallel to the beam. Alternatively, the axle may be made of two segments that pass into but not through the beam. On each end of the axle or axles there is an axle nut and axle nut washer. The ball pivot may be an integral part of the hanger body or may be a separate attached component. The ball pivot is formed so that it may rotate in a similar sized pivot cup by at least about twenty degrees in any direction without making contact with the pivot cup wall (FIG. 15). The ball pivot has a diameter that is preferably at least 13 mm in diameter. There is an aperture in the hanger assembly body through which a kingpin passes that is located between the axle or axles and the ball pivot. The aperture has two elastomeric bushing seats that are concentric with the aperture and centerline of the kingpin. The bushing seats are located above and below the aperture (FIG. 3).

Figure 14:
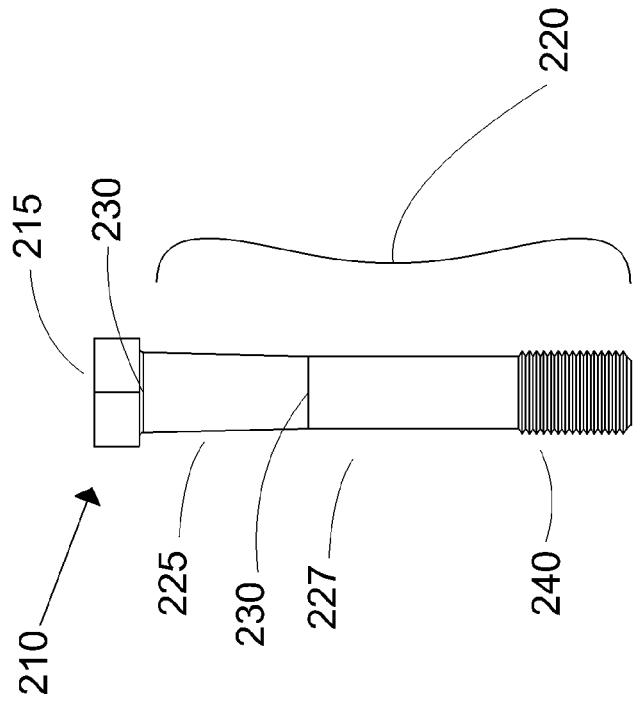
FIG. 14 is a top view of the kingpin of FIG. 3, illustrating the tapered section of the shaft.
Figure 13:
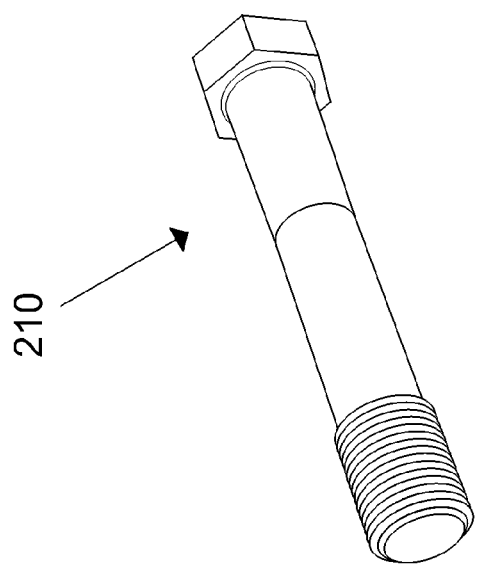
FIG. 13 is a perspective view of the kingpin of FIG. 3.

The baseplate assembly is comprised of a baseplate body, pivot cup and a tapered kingpin (FIGS. 13-14). The baseplate body has a pivot cup cavity in its forward section into which a removable friction fit pivot cup is installed. There are holes drilled into both sides of the baseplate body that are used to provide a means of attachment for the baseplate to the skateboard deck using fasteners.

The pivot cup that is installed in the baseplate cavity bore provides a load bearing surface for the hanger assembly ball pivot. The pivot cup is designed to transmit loads from the ball pivot to the side-walls of the baseplate pivot cup cavity. The outside surface of cylindrical section of the pivot cup includes retention fins or rings that provide for a friction fit allowing friction based retention of the pivot cup in the pivot cup cavity. The exterior bottom surface of the pivot cup is angled so that no surface is more than fifty degrees off a line running through the center of the pivot cup hole in the bottom of the pivot cup and the center of the hanger-body bushing aperture. The bottom of the pivot cup is more steeply angled than prior art to allow the cup to compress down and toward the center of the pivot cup cavity in the baseplate. The inside contours of the pivot cup include self-cleaning groves that are designed to remove dirt or debris from the ball pivot when the ball pivot rotates. In the center bottom of the pivot cup there is a hole that provides a void for the pivot cup to compress down and into the bottom of the baseplate pivot cup cavity. The hole in the bottom of the pivot cup is also is designed to collect debris as part of the pivot cup's self-cleaning function and if threaded to provide for a means of threaded mechanical extraction using a threaded shaft or the axle of the hanger assembly.

There is a kingpin support structure on the rear of the baseplate body that contains a tapered bore-hole into which the tapered kingpin is installed. The kingpin is a separate component that is inserted into the baseplate's tapered kingpin bore hole as part of the overall baseplate assembly. The kingpin has a tapered section proximate to the end of the kingpin where the head is designed to prevent rotation. The section in the middle of the kingpin where elastomeric bushings are later installed is of constant diameter that is smaller than the maximum diameter of the kingpin proximate to the head. The end of the kingpin distal from the head of the kingpin has threads that engage a kingpin nut. The kingpin relies on an enlarging taper proximate to the head of the kingpin that matches the angle of taper found in the kingpin bore hole for its mechanical connection to the baseplate. The taper provides for kingpin retention and load transfer to the baseplate through the sidewalls of the tapered kingpin bore hole. Rotation of the tapered kingpin is prevented by trapping the head of the kingpin on the side of the kingpin bore hole that is distal from the side of the kingpin bore hole that is adjacent to the lower elastomeric bushing bearing surface.

The ball pivot hanger assembly is installed in the baseplate assembly by first placing the lower elastomeric bushing on the kingpin in contact with the adjoining baseplate bearing surface. The second step is to concurrently insert the ball pivot on the hanger assembly into the baseplate pivot cup while lowering the hanger assembly over the kingpin until the lower bushing seat on the hanger assembly has fully engaged the lower elastomeric bushing. Next, the upper elastomeric bushing is placed over the kingpin and seated into the upper bushing seat of the ball pivot hanger assembly. A bushing washer is placed on top of the upper elastomeric bushing. Finally a kingpin nut is threaded onto the kingpin resulting in compression of the bushing washer and the elastomeric bushings. (FIG. 1).

When fully assembled, the hanger assembly is sandwiched on both sides of the kingpin aperture by two elastomeric bushings, a kingpin washer and kingpin nut in a manner that allows the rider to adjust the level of pressure on the elastomeric bushings to increase or decrease the level of force required to angle the skateboard deck. The functional assembly traps the ball pivot on the hanger assembly in intimate contact with the pivot cup in the baseplate so that the ball pivot hanger assembly can rotate without interference and transfer loads effectively into the side wall of the baseplate as the mechanism is rotated from side to side (FIGS. 3, 38).

The drawings, with the exception of those labeled "prior art," illustrate an embodiment of a skateboard truck 10 comprising a ball pivot hanger 15, a baseplate assembly 115, a pivot cup 155, a kingpin 210, bushings 242 and 245, and various fastening members, including washers 250, 36 and nuts 255, 37.

Geometry

The skateboard truck 10 improves upon previous skateboard truck designs by changing the geometry and design of one or more key elements of the skateboard truck 10. Several of these improvements contribute to a high level of mechanical advantage 295 and improved turning function. These improvements include a larger diameter ball pivot 65, effective transfer of ball pivot loads 142 into the side of the pivot cup cavity 140, precision bushing seats 40, the physical form of the baseplate 115 and the hanger 15, and a tapered kingpin 210. The improvements, whether considered singly or more preferably in combination, improve riding performance, mechanical function, durability, constructability and maintainability. It should be understood that the invention encompasses not only the synergistic combination of these various improvements, but also sub-combinations and single ones of these improvements.

Ball Pivot Hanger

FIGS. 2-4, 6 and 20 illustrate one embodiment of a ball pivot hanger 15. The ball pivot hanger 15 comprises a structural member 20, an integral axle 30 (or a pair of axles 30 mounted in the ends of the beam 20), bushing seats 40, and a ball pivot 65. The structural member 20 has a form determined by the principles of a wide flange I-beam. Reliefs 28 strategically reduce the mass and weight of the hanger 15 with minimum impact on the hanger's 15 strength. The structural member 20 is oriented to span the widest direction of the hanger 15. The integral axle 30, or axles 30 if separate axles are utilized, optionally made of a dissimilar material, runs from one end of the beam 20 to the other protruding so as to provide a mounting location for skateboard wheels 325.

The ball pivot hanger 15 includes two axle bearing spacing steps or bosses 35 (e.g., machined features at opposite distal ends of the structural member 20). Each boss 35 creates a separation 31 between the axle bearing surface 32 and the face 33 of the structural member 20 within which the axle 30 is contained so as to provide a bearing standoff that eliminates the need for an axle washer 36 known as a speedring. The boss 35 supports the central race 34 of the bearing and prevents the outer race 39 from making contact with the adjoining structural member 20. Alternatively, the structural member 20 that embraces the axle 30 (or pair of axles 30) includes two bearing standoffs 35 that separate a bearing surface 32 of the structural member 20 from a non-bearing surface of the face 33 of the structural member 20 that embraces the axle 30. The standoff may also be an additional component that is attached to the structural member 20 or axle 30.

Concentric top and bottom bushing seats 40 extend outwardly from a midsection of the structural member 20 and provide a zero tolerance fit for elastomeric bushings 242, 245. An aperture 45 formed through the centers of the bushing seats 40 receives a kingpin 210 to mount the hanger 15, sandwiched between the two elastomeric bushings 242, 245 to the baseplate 115. An aperture 45 in the hanger 15 between the ball pivot 65 and the axle 30 allows a kingpin 210 to pass through the hanger 15 to assemble the hanger 15 to the baseplate 115.

Ball pivot

Figure 6:
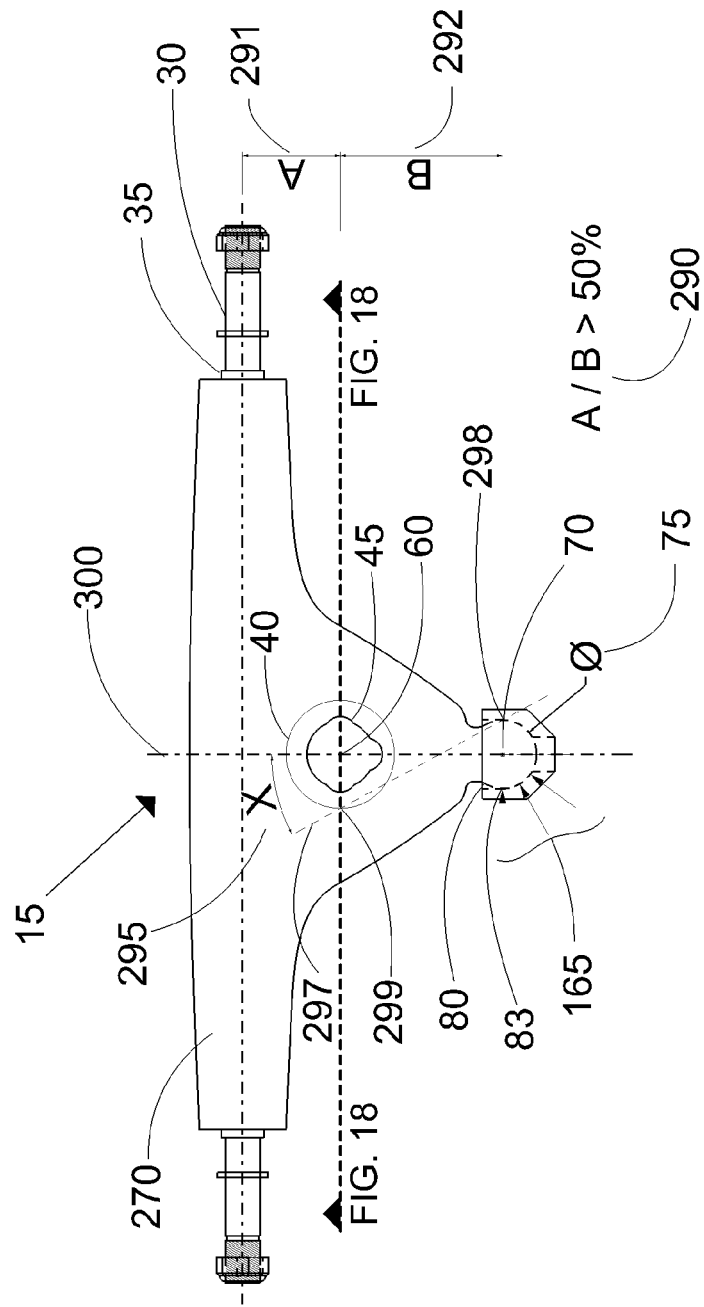
FIG. 6 is a top view of the hanger assembly of the skateboard truck assembly of FIG. 2, illustrating dimensions that factor into the kingpin ratio, the angle of mechanical advantage, and center of pressure.
Figure 16A:
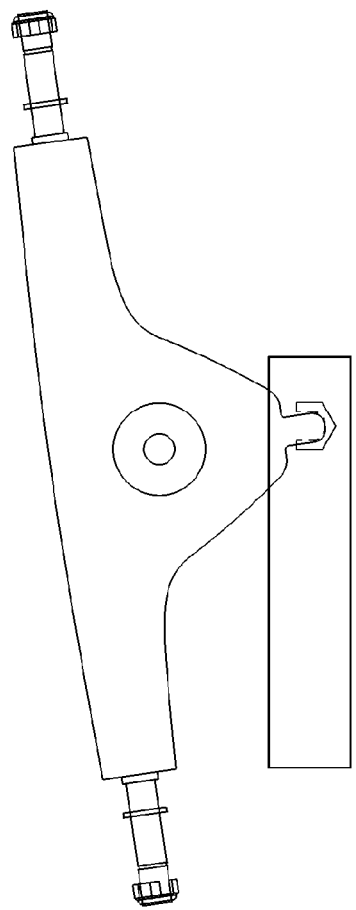
FIG. 16A is a top view of a prior art hanger while articulated, as it would characteristically be if a skateboard or longboard deck to which it were coupled were bearing a statically unbalanced load.
Figure 16B:
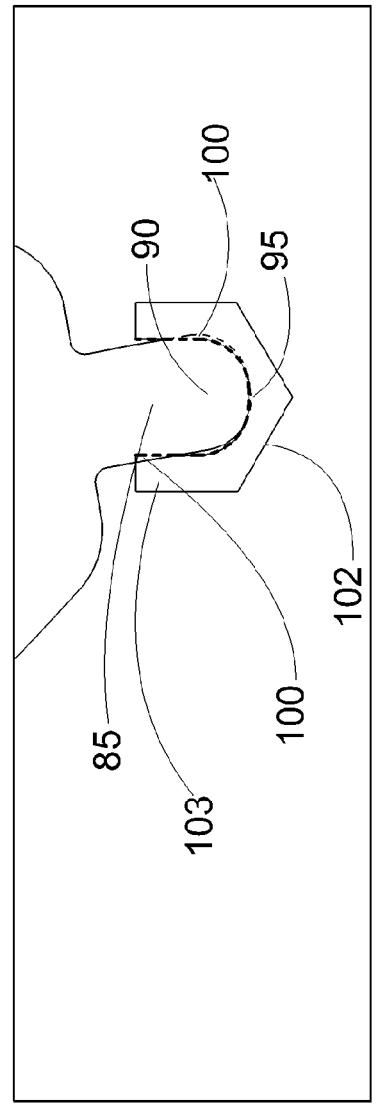
FIG. 16B is a top detail view of the prior art pin pivot and pivot cup of FIG. 16A, illustrating the interference zone of the pin pivot and pivot cup.

FIG. 15 illustrates one embodiment of a ball pivot 65 incorporated into a hanger 15. The ball pivot 65 extends perpendicularly out from the midsection of the structural member 20 and axle 30 and is, in one embodiment, preferably cast, forged, or machined as an integral part of the hanger 15 (FIG. 6). The ball pivot 65 located on the hanger 15 differs from other traditional pin pivot or ball designs due to its much larger diameter 75, preferably at least 13 mm, and resulting larger bearing surface. The ball pivot's 65 larger surface area combined with the pivot cup 155 and baseplate 115 design allow for pivot loads 142 to be transferred into the side wall 147 and tapered cavity walls 145 of the baseplate pivot cup cavity 140 instead of the bottom of the pivot cavity 140 as is typical with prior art (FIG. 16). The design of the ball pivot 65 transfers turning load from the ball pivot 65 to the side wall 160 of the pivot cup 155 at a point much closer to the kingpin 210 compared to the small diameter ball or pin pivots 85 of many other designs, that transfer load from the pivot 85 to or near the bottom 102 of the pivot cup 103 through the end 95 of the pivot 85 distal to the axle. The large diameter ball pivot hanger 15, pivot cup design 155, tapered kingpin 210 and baseplate 115 design act synergistically to achieve improved turning performance.

Figure 7:
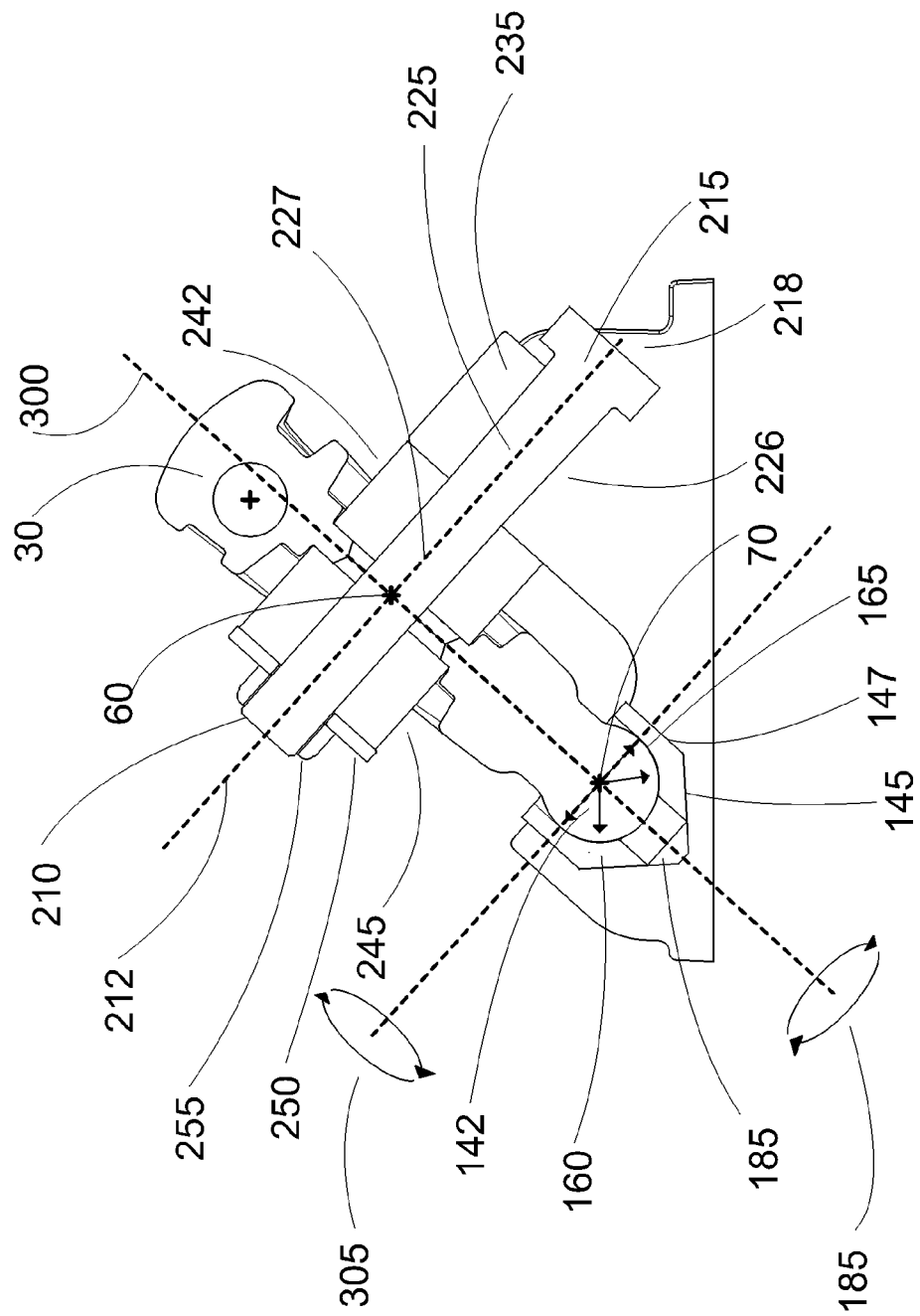
FIG. 7 is a side section view of the truck assembly of FIG. 2, which illustrates the kingpin and baseplate angles of the truck, dual axes of rotation, and pivot load transfer.

The ball pivot 65 provides unrestricted movement when compared to prior art pin pivots 85 that are not designed to accommodate significant unrestricted rotation on two planes as the skateboard truck 320 is articulated. The ball pivot 65 provides unrestricted turning action within at least about ten degrees from a neutral center line 300 that passes through the center of rotation 70 and a point 60 coincident with the center of the kingpin aperture 45 and the longitudinal center 212 of the kingpin 210 (FIGS. 7, 13-14). Unrestricted turning action within the non-interference area 80 (FIG. 15) is achieved due to an absence of mechanical interference with the pivot cup side wall 160 or progressive resistance from the compression of an elastomeric pivot cup 100 as is common with prior art designs (FIG. 16). This improvement also eliminates the stress and mechanical wear that takes place with many conventional pin pivot 85 designs when they make physical contact with the wall of the pivot cup or pivot cup cavity. The ball pivot 65 on the hanger 15 in conjunction with the pivot cup 155 is configured to provide constant low-friction intimate contact between the pivot cup 155 and the ball pivot 65 allowing the ball pivot 65 to pass its loads through the sidewalls 160 of the pivot cup 155 and then directly into the side wall 160 of the baseplate pivot cup cavity 140.

Pivot Cup

FIGS. 9-12 illustrate one embodiment of a pivot cup 155. The pivot cup 155 is installed in the baseplate pivot cup cavity 140. The pivot cup 155 comprises an internal pivot-bearing surface area 165 defined by curved cylindrical interior sidewalls 160, a cylindrical outer top surface 162, a ramped outer bottom surface 170, cleaning grooves or channels 180, retention fins or rings 195, 200, and a ramping tolerance fin 205.

The pivot cup 155 is formed with a bottom center hole or pocket 185 that is configured to avoid contact with a bottom surface area portion 165 of the ball pivot 65 of at least approximately 0.6 steradians. This causes pivot loads 177 to be transferred into the side wall 147 of the baseplate pivot cup cavity 140 instead of the bottom of the pivot cavity as is typical with prior art (FIG. 16).

The pivot cup 155 provides a load bearing low friction constant contact transfer surface between the ball pivot 65 and the baseplate pivot cup cavity side wall 147. The pivot cup 115 may be composed of nylon, POM (acetyl), PU (Polyurethane) or other suitable low friction, bearing surface materials. The cylindrical outer top surface 162 of the pivot cup 155 contains fins or rings 195, 200, 205 designed to compensate for dimensional tolerance variations between the pivot cup 155 and the pivot cup cavity 140. The fins 195 retain the pivot cup 155 in the pivot cup cavity 140 and prevent pivot cup 140 rotation. The pivot cup's outer bottom surface 170 is angled to match the bottom portion 145 of the baseplate pivot cup cavity 140 (FIG. 7). This angle provides a ramping force toward the center of the pivot cup cavity 140 when the pivot cup 155 is pressed into the cavity 140. The ramping force is present when the truck 10 is in use and loads are applied via the rider's weight through the ball pivot 65 on the hanger 15. The ramping action is designed to center and compress the pivot cup 155 in the baseplate pivot cup cavity 140.

Figure 4:
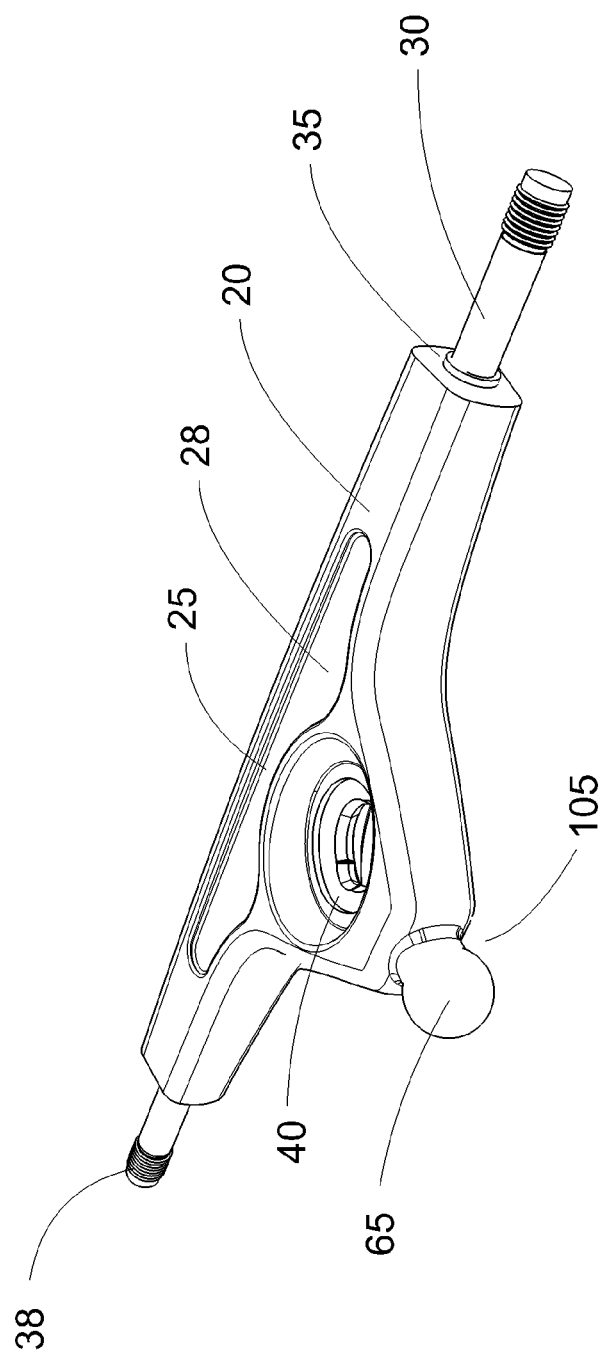
FIG. 4 is a perspective view of a hanger assembly of the truck of FIG. 2.
Figure 5:
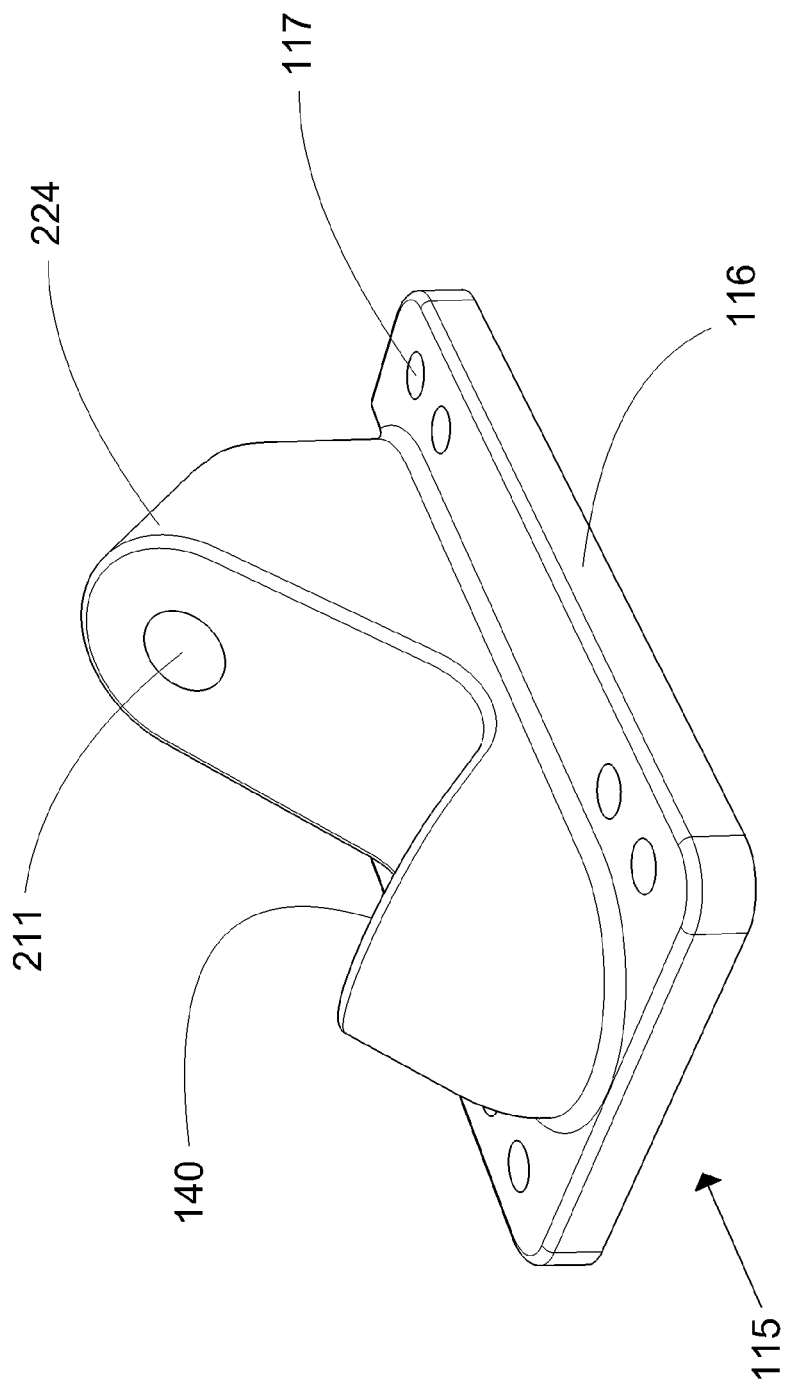
FIG. 5 is a perspective view of a baseplate assembly of the truck of FIG. 2.
Figure 17:
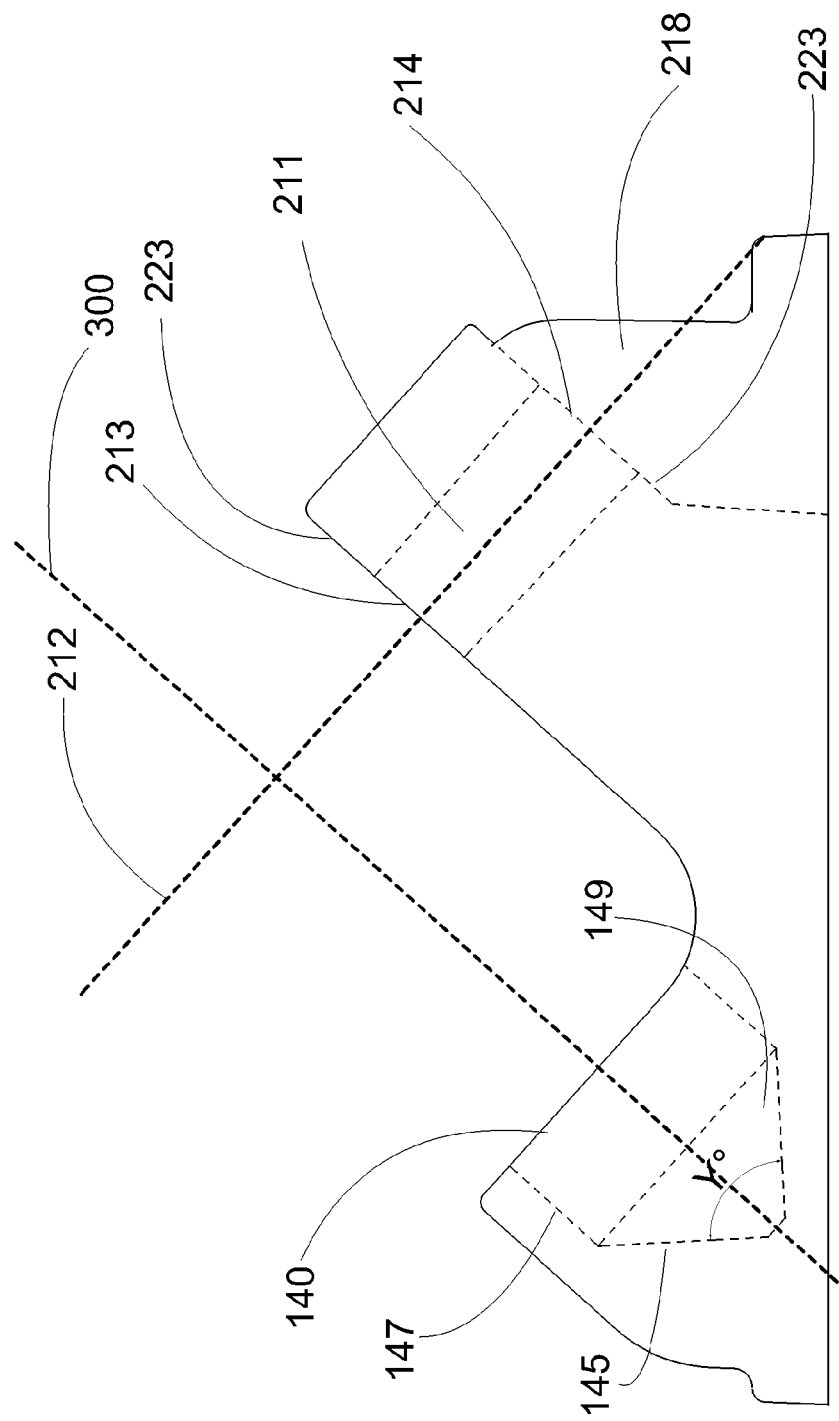
FIG. 17 is a side view of the baseplate of FIG. 3, showing the tapered walls and kingpin support section.
Figure 18:
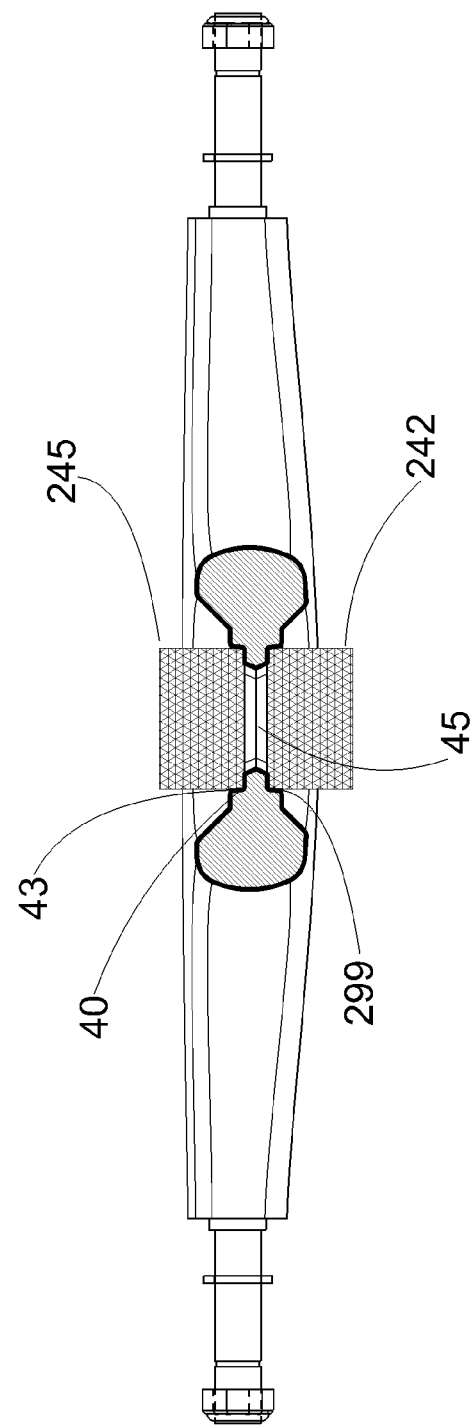
FIG. 18 is a sectional view of the hanger assembly along the line 1-1 of FIG. 3 in the direction of the arrows, illustrating the bushing seat.
Figure 19A:
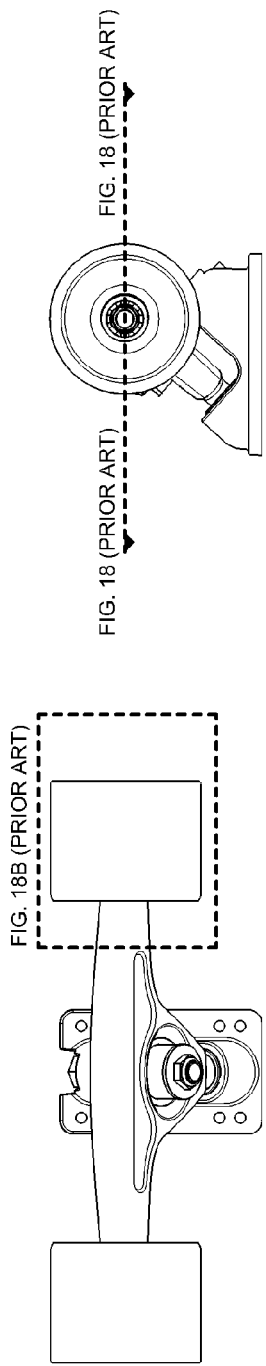
FIG. 19A is a top view of a prior art skateboard truck assembly with wheels mounted.
Figure 19B:
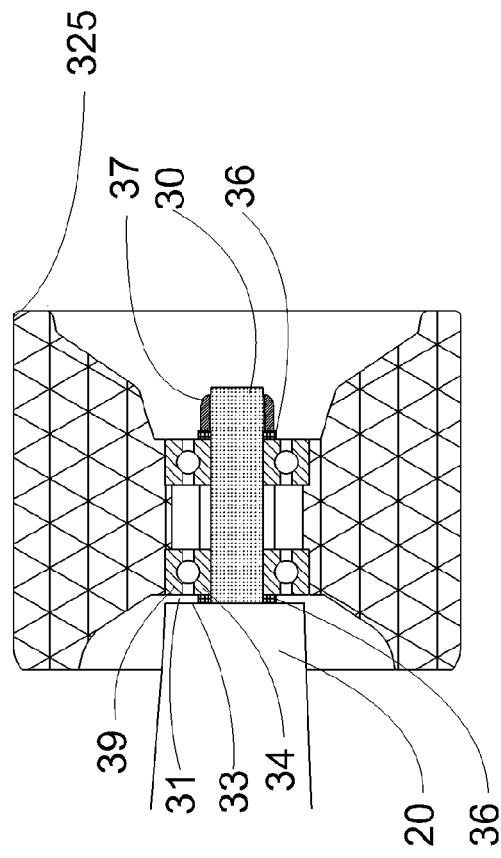
FIG. 19B is a detailed top view of a prior art skateboard truck assembly with wheels mounted showing the need for two axle washers to create the necessary separation between the outer bearing race and face of the structural member.
Figure 20A:
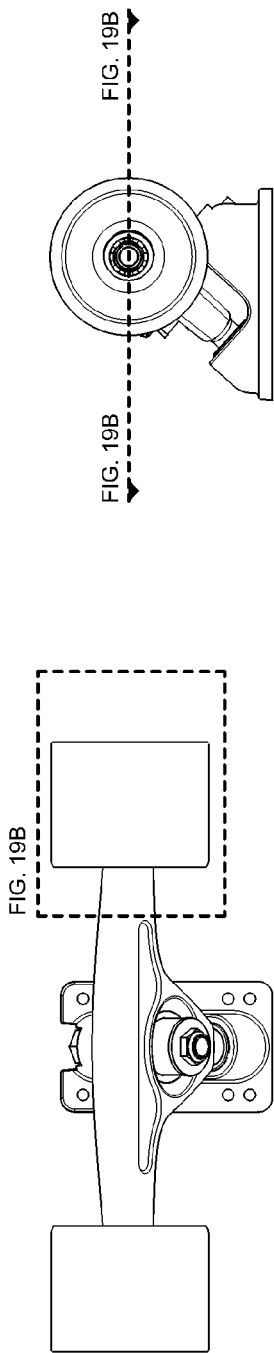
FIG. 20A is a top view of the skateboard truck assembly with wheels mounted.
Figure 20B:
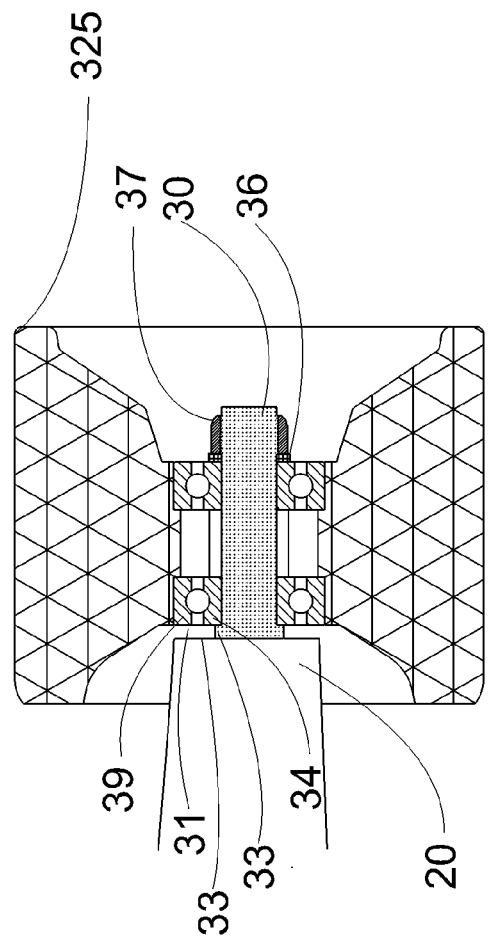
FIG. 20B is a detailed top view of the skateboard truck assembly with wheels mounted showing that the integral bearing standoffs create the necessary separation between the outer bearing race and face of the structural member.

The interior sidewalls 160 of the pivot cup 155 contain grooves or channels 180 designed to provide a self-cleaning action relative to the surface of the ball pivot 65 as it rotates in the pivot cup 155 (FIG. 10, 11). The pivot cup 155 contains a hole 185 in its center so that as the pivot cup 155 is driven into the pivot cup cavity 140 by the ramping action it can compress without interference inward toward the center of the pivot cup cavity 140, ensuring intimate contact between the internal pivot-bearing surface area 165 of the pivot cup 155 and the ball pivot 65. The center hole 185 in the bottom of the pivot cup 155 also serves to provide self-cleaning, debris retention and threaded mechanical extraction functions. The pivot cup's center hole 185 may be threaded, allowing mechanical extraction of the pivot cup 165 from the pivot cup cavity 140 using a threaded rod or hanger axle 30 (FIG. 4). Prior art pivot cups are made of soft elastomeric material and do not incorporate self-cleaning, self-centering, tolerance absorbing components, a provision for mechanical removal using threaded tools, or steep ramping surfaces Baseplate FIGS. 5, 7 and 17 illustrate one embodiment of a baseplate 115. The baseplate 115 comprises a flanged base 116, a kingpin support structure 224, and a pivot cup cavity bore 140. The pivot cup cavity bore 140, located at a forward section of the baseplate 115, is drilled at angle parallel to the primary or first axis 300 of rotation of the hanger 15. The top portion 147 of the pivot cup bore 140 is defined by cylindrically shaped walls. The bottom portion 145 of the pivot cup bore 140 is defined by conically shaped tapered cavity walls angled no more than fifty degrees off of the primary rotational axis 300. Accordingly, the opening angle 149 formed by the tapered cavity walls is no greater than one hundred degrees. The steep tapering of the cavity walls use the force from the rider's weight that is applied via the ball pivot 65 to drive the pivot cup 155 into the angled bottom portion 145 of the pivot cup cavity bore 140. The ramped outer bottom surface 170 of the pivot cup 140 is configured with angles that match the angle of the bottom portion 145 of the pivot cavity bore 140 and allows for pivot cup compression into the pivot cup cavity bore 140. Compression of the pivot cup 155 aids in preserving the constant center of rotation 70 allowed for by the ball pivot 65.

Also unlike prior art, on the rear section of the baseplate 115 there is a section of the body through which a tapered borehole 211 provides a support structure for the tapered kingpin 210. The diameter 214 of the kingpin bore 211 hole proximate to the bolt head 215 is larger than the bore diameter 213 distal to the bolt head 215 (FIG. 17). The lower section 222 of the kingpin support structure 224 includes a channel 218 that is used to prevent rotation of the kingpin's head 215 when the kingpin nut 255 is tightened to adjust bushing 242, 245 tension. The upper section 223 of the kingpin bore hole 211 is designed to function as a seat for the lower elastomeric bushing 242. The flanges 116 of the base extend along both sides of the baseplate 115. The flanges 116 contain holes 117 that provide a means to use fasteners to attach the baseplate 115 to the skateboard deck 330 (FIG. 5, 7, 17).

Kingpin

FIGS. 3, 7, and 13-14 illustrate one embodiment of a tapered kingpin assembly 207. The tapered kingpin assembly 207 comprises a tapered kingpin 210, a kingpin bushing washer 250, two elastic bushings 242, 245, and a nut 255. The tapered kingpin 210, which comprises a head 215 connected to a shaft 220, is used to connect the hanger 15 to the baseplate 115. The tapered kingpin 210 is removable with no damage to the baseplate assembly 115 and achieves a zero clearance fit when tightened into a matching tapered baseplate kingpin borehole 211. When tightened by the compression of the kingpin nut 255 against the kingpin bushing washer 250 and two elastomeric bushings 242, 245, the kingpin 210 acts as a rigid and integral component of the baseplate 115. This increased rigidity of the baseplate 115 and kingpin assembly 207 results in improved turning performance by eliminating rocking or working of the kingpin 210 back and forth in a traditional kingpin borehole.

Prior art includes two primary styles of kingpins. Kingpins that were intended to be removable were based on a simple bolt design with dimensional tolerances that resulted in movement of the kingpin from side to side in the kingpin baseplate bore hole as the truck was subjected to turning actions. Alternatively kingpins used in some prior art skateboard trucks incorporated barbed or splined driven bolts that were driven into the kingpin borehole. The splined or barbed bolt design was not easily removable and the process of removal and reinstallation would frequently result in damage to the kingpin bore hole that would further allow the kingpin to work back and forth as the deck angle was changed. Both the traditional bolt and barbed or splined prior art kingpin designs resulted in degraded truck performance, constructability and or maintainability.

The kingpin shaft 220 includes a middle tapered section 225. The remaining one or more sections of the shaft including the threaded end 240 and the constant diameter, are untapered. The tapered portion 225 of the kingpin 210 is located along a portion of the shaft that, when assembled, makes contact with the tapered baseplate borehole 211. The tapered portion 225 of the kingpin 210 is distal from the threaded end 240 of the kingpin 210 and proximate to the polygonal head 215. The diameter 230 of the kingpin 210 gets progressively smaller as one travels the length of the tapered section 225 of the shaft 220 from the top end of the tapered section 225, proximate to the polygonal head 215, toward the bottom end of the tapered section 225, relatively more proximate to the bolt threads 240. The diameter 227 of the kingpin 210 is constant in the un-tapered sections 227 of the shaft 220 which are not designed to engage the baseplate tapered borehole 211, including locations where the kingpin 210 passes through the elastomeric bushings 242, 245 (FIG. 7, 13, 14).

The tapered kingpin 210 can be inserted into the tapered baseplate bore hole 211 until the increasing diameter of tapered kingpin 210 exceeds the matching maximum tapered borehole diameter 213, 214. The kingpin 210 seats in the tapered borehole 211 with an intimate, zero clearance fit because the kingpin 210 always tapers to a diameter 230 larger than the largest tapered kingpin bore diameter 213 in the baseplate 115. The tapered shaft 225 of the kingpin 210 is designed retain the kingpin 210 with the head 215 of the kingpin 210 slightly out of contact with the side of the tapered baseplate borehole 130 that is opposite from the side 241 where the elastomeric bushings 242, 245 seat (FIG. 7, 17, 13, 14).

The tapered kingpin 210 and tapered kingpin bore hole 211 provide a precision zero clearance kingpin fit in the baseplate kingpin tapered bore hole 211 while allowing for easy removal without damage to the kingpin 210 or kingpin borehole 211. Because the kingpin 210 is in intimate contact with the tapered sidewalls 226 of the baseplate 115, the baseplate 115 and kingpin 210 act as one unit transmitting forces precisely and immediately from the changing deck angle 318 into the truck assembly 10 (FIG. 7, 17, 13, 14).

Center of Rotation

The location of the center of rotation 70 of the ball pivot 65 (FIG. 6) is different from prior art. The center of rotation 70 of the ball pivot 65 (FIG. 6), and the center of rotation 95 of a conventional prior art pin pivot 85, are both herein defined as a point within or upon the surface of the pivot 65, 80 that translates the least, with respect to the baseplate, as the pivot 65, 80 rotates within a similarly sized pivot cup 155. The larger diameter ball pivot 65 combined with the pivot cup 155 and baseplate 115 designs move the center of rotation 70 closer to the center of the kingpin aperture than is found in prior art designs. The center of rotation 70 is in the geometric center of the ball pivot 65. Prior art designs have pin or ball pivots that are typically less than 13 mm in diameter. The center of rotation 95 for prior art pin or ball pivots is the center of the pivot radius proximate to the end of the pivot. Due to the small pivot diameter and the use flexible low-durometer pivot cups (e.g., below 95a durometer), these prior art designs transfer load thru the end of the pivot by bearing on the bottom of pivot cup. In most cases the use of a small diameter pivot and an elastomeric pivot cup does not provide for a constant center rotation (FIG. 6, 15, 16).

Center of Pressure

The center of pressure 83 (FIG. 6) for the ball pivot 65 is the location on the ball pivot's face central to where the greatest load is transmitted through the walls of the pivot cup 155. As a result of moving the center of rotation 70 of the ball pivot 65 back to a point equidistant from all sides of the ball pivot's 65 rotating sphere, the center of pressure 83 also moves back and to the side of the ball pivot 65 relative to traditional pin pivot or ball pivot designs 65. When turning the truck 10, the center of pressure 83 is applied against the side 147 of the pivot cup cavity 140 at a point that is significantly distal from the bottom of the pivot cup cavity 140. The center of pressure for prior art pin or ball pivots, by contrast, is concentrated proximate to the bottom of the pivot cup cavity.

Angle of Mechanical Advantage

Various aspects of the invention contribute to the truck's high and consistent mechanical advantage 295 in translating and amplifying the force a rider exerts on the deck into a force that turns the truck (FIG. 6). One influential contribution to the truck's mechanical advantage is the angle 295 between two lines, referred to herein as the "angle of mechanical advantage." The first line is the primary rotational axis 300 that runs between the center 60 of the kingpin aperture 45 and the ball pivot's constant center of rotation 70 (FIG. 7). The second line 297 runs between an outermost contact point 298 of the ball pivot 65 with the pivot cup 155 and the opposing outermost bearing surface 299 of the bushing seat 40 that retains the elastomeric bushing 242, 245 laterally in the hanger 15. Stated another way, the angle of mechanical advantage 295 is approximately equal to an inverse tangent of the sum of the ball pivot radius and the kingpin bushing radius divided by the ball-pivot-center-to-kingpin-center distance. A higher angle of mechanical advantage 295, one that is, for example, at least twenty and preferably at least twenty-five degrees, significantly improves the rider's ability to compress the elastomeric bushings 242, 245 and magnifies the turning action of the truck 10 when compared with prior art designs. Additionally, the higher level of mechanical advantage 295 allows the truck 10 to rotate on two planes concurrently.

The proximity between the center of rotation 70 of the ball pivot 65 and the center 60 of the kingpin aperture 45, the diameter 75 of the ball pivot 65, the diameter 41 of the bushing seat 40, and the lack of movement achieved by the tapered kingpin 210 all combine to influence the angle of mechanical advantage 295 and the overall effective leverage the rider achieves against the elastomeric bushings 242, 245. A high mechanical advantage 295 without pivot cup 155 restriction also facilitates a more dynamic turning response characteristic.

King Pin Ratio

Another contribution to the truck's mechanical advantage is the kingpin ratio (FIG. 6). The kingpin ratio 290 is defined by the distance 291 between the kingpin aperture center 60 and longitudinal axle centerline 270 divided by the distance 292 between the ball pivot center 70, or the constant center of rotation 70 and the kingpin aperture center 60. The hanger 15 has a kingpin ratio 291, expressed as a percentage, of fifty-two percent or more.

A higher percentage kingpin ratio, in addition to a high angle of mechanical advantage, contributes to the truck's greater mechanical advantage relative to prior art designs.

Concurrent Rotation on Two Axis

The ball pivot hanger 15 rotates concurrently around two axes 300, 305 (FIG. 7). The first axis 300 is between the constant center of rotation 70 of the ball pivot 65 and the kingpin aperture center 60. The second axis 305 is parallel to the longitudinal centerline 212 of the kingpin 210 and runs thru the constant center of rotation 70 of the ball pivot 65. This second axis 305 allows the hanger 15 to shift from side to side relative to the kingpin 210 while concurrently rotating relative to the first axis 300 with no pivot cup 155 or pivot cup cavity interference 140. To rotate around the second axis 305, the bushings 242, 245 must be compressed parallel to the kingpin bore hole 211 and the hanger bushing seat retention wall 43. Any change in deck angle results in both a vertical compression and horizontal compression of the bushings relative to the kingpin (FIG. 7).

Riding benefit of Design

All of the forces that compress the bushings 242, 245 and result in the articulation of the hanger 15 are from the rider's weight. All of the rider's weight is supported by the four wheels 325 mounted on the two axles 30. A larger distance 291 between the axle 30 and kingpin aperture center 210 in relation to the distance 292 from the kingpin aperture center 210 to the constant center of rotation 70 results in greater mechanical advantage. A greater mechanical advantage results in more leverage acting on the bushings 242, 245. With more leverage on the bushings 242, 245, the rider is able to more effectively rotate the hanger 15 around the first 300 and the second axes 305. Because of this increased mechanical advantage 295, the lack of pivot interference with the pivot cup 155 or baseplate pivot cup cavity 140, and the ability to rotate the hanger 15 concurrently around two axes 300, 305, immediate articulation is achieved resulting in improved turning performance.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A skateboard or longboard truck comprising:
   a ball pivot hanger including a structural member oriented along a lateral axis and configured to support two wheels, a ball pivot extending out perpendicularly from the structural member, and a bushing seat and kingpin aperture located between the structural member and the ball pivot; and
   a baseplate assembly, the baseplate assembly having a base that mounts underneath a skateboard or longboard deck configured to receive a kingpin to secure the ball pivot hanger assembly to the baseplate assembly;
   wherein the hanger is configured with an angle of mechanical advantage of at least twenty degrees, the angle being defined by two lines, the first line running between a center of the kingpin aperture coincident with a longitudinal center of the kingpin and the ball pivot's center of rotation, and the second line running between a contact point of the ball pivot with the pivot cup on one side of the first line and a bearing surface of the bushing seat on an opposite side of the first line.

2. The skateboard or longboard truck of claim 1, wherein the mechanical advantage angle exceeds twenty-five degrees.

3. The skateboard or longboard truck of claim 1, wherein the ball pivot has a diameter of at least 13 mm.

4. The skateboard or longboard truck of claim 1, wherein the ball pivot is cast, forged or machined as an integral part of the hanger.

5. A skateboard or longboard truck comprising:
   a ball pivot hanger including a structural member oriented along a lateral axis and configured to support two wheels and a ball pivot extending out from the structural member in a direction perpendicular to the structural member; and
   a baseplate assembly, the baseplate assembly having a base that mounts underneath a skateboard or longboard deck configured to receive a kingpin to secure the ball pivot hanger assembly to the baseplate assembly;
   wherein a kingpin ratio, defined by a distance between a lateral axle centerline perpendicular to the kingpin and a kingpin longitudinal centerline, divided by a distance between the ball pivot's constant center of rotation and the kingpin longitudinal center line, expressed as a percentage, is more than fifty-two percent.

6. The skateboard or longboard truck of claim 5, wherein the kingpin ratio is at least fifty-five percent.

7. The skateboard or longboard truck, wherein the structural member of the ball pivot hanger embraces an axle or pair of axles that support the wheels, wherein the axle or pair of axles include two bearing standoffs that separate a bearing surface of the axle from a face of the structural member that embraces the axle.

8. The skateboard or longboard truck, wherein the structural member of the ball pivot hanger embraces an axle or pair of axles that support the wheels and includes two bearing standoffs that separate a bearing surface of the structural member from a face of the structural member.

* * * * *